United States Patent
Blanckenfiell et al.

(10) Patent No.: US 11,846,330 B2
(45) Date of Patent: Dec. 19, 2023

(54) METHOD FOR DEFINING A CLUTCH SLIPPING POINT POSITION

(71) Applicant: VOLVO TRUCK CORPORATION, Gothenburg (SE)

(72) Inventors: Magnus Blanckenfiell, Hisings Kärra (SE); Fredrik Karpenman, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/785,577

(22) PCT Filed: Dec. 18, 2019

(86) PCT No.: PCT/EP2019/086033
§ 371 (c)(1),
(2) Date: Jun. 15, 2022

(87) PCT Pub. No.: WO2021/121582
PCT Pub. Date: Jun. 24, 2021

(65) Prior Publication Data
US 2023/0023400 A1 Jan. 26, 2023

(51) Int. Cl.
*F16D 48/06* (2006.01)
*F16H 61/682* (2006.01)

(52) U.S. Cl.
CPC ........... *F16D 48/06* (2013.01); *F16H 61/682* (2013.01); *F16D 2500/10412* (2013.01);
(Continued)

(58) Field of Classification Search
None
See application file for complete search history.

(56) References Cited

U.S. PATENT DOCUMENTS 4,899,858 A  2/1990 Cote et al.
5,393,274 A  2/1995 Smedley
(Continued)

OTHER PUBLICATIONS

International Search Report and Written Opinion for International Patent Application No. PCT/EP2019/086033, dated Sep. 11, 2020, 10 pages.

*Primary Examiner* — Timothy Hannon
(74) *Attorney, Agent, or Firm* — Sage Patent Group

(57) ABSTRACT

The present disclosure relates to a method for defining a clutch slipping point position ($X_{sp}$) of a clutch in a gearbox comprising an input shaft arranged to be braked by a braking means. The method includes determining if the clutch is dragging when the clutch is fully disengaged. The method includes when it is determined that the clutch is dragging, applying the braking means with a predetermined brake torque ($T_b$) and so that the input shaft is not rotating; and thereafter: moving the clutch from the fully disengaged position towards an engaged position; determining when the input shaft starts to rotate with a predetermined rotation value indicative of a rotational speed of the input shaft; registering a clutch position ($X_b$) in which the clutch is positioned when the predetermined rotation value is reached; using a clutch transfer characteristics of the clutch, $T_b$, and $X_b$ to define the clutch slipping point position ($X_{sp}$).

17 Claims, 2 Drawing Sheets

(52) U.S. Cl.
CPC ............... *F16D 2500/1112* (2013.01); *F16D 2500/3026* (2013.01); *F16D 2500/30406* (2013.01); *F16D 2500/30417* (2013.01); *F16D 2500/30426* (2013.01); *F16D 2500/50263* (2013.01); *F16D 2500/70264* (2013.01); *F16H 2342/042* (2013.01)

(56) References Cited

U.S. PATENT DOCUMENTS

| | | |
|---|---|---|
| 6,022,295 A | 2/2000 | Liu |
| 2009/0090591 A1 | 4/2009 | Petzold et al. |
| 2012/0150403 A1 | 6/2012 | Juhlin-Dannfelt |

METHOD FOR DEFINING A CLUTCH SLIPPING POINT POSITION

CROSS REFERENCE TO RELATED APPLICATIONS

This application is a 35 U.S.C. § 371 national stage application of PCT International Application No. PCT/EP2019/086033 filed on Dec. 18, 2019, the disclosure and content of which is incorporated by reference herein in its entirety.

TECHNICAL FIELD

The present invention relates to a method for defining a clutch slipping point position of a clutch in a gearbox. The present invention further relates to a control unit for a gearbox, to a gearbox, to a vehicle, to a computer program and/or to a computer-readable medium.

The invention can be applied in heavy-duty vehicles, such as trucks, buses and construction equipment. Although the invention will be described with respect to a heavy-duty truck, the invention is not restricted to this particular vehicle, but may also be used in other vehicles such as light-weight trucks, articulated haulers, excavators, wheel loaders and backhoe loaders.

BACKGROUND

In vehicle gearboxes, also known as transmissions, the clutch slipping point position may be very important to estimate in order to be able to control the clutch accurately during e.g. take-off and shifting. This may be particularly important for automated mechanical transmissions (AMT), which are commonly used in e.g. trucks.

The clutch slipping point position is typically the clutch position where a small defined torque is transferred, e.g. 30 Nm. Outside this position the clutch can be regarded as disengaged and lower torque than 30 Nm may be transferred. Inside this position the torque will increase according to a known characteristic.

The clutch slipping point position is often estimated by monitoring the acceleration of a gearbox input shaft while the clutch is moving slowly from a disengaged position towards an engaged position. It has however been realized that this approach may not always provide a reliable estimation of the clutch slipping point position.

In view of the above, it is desired to provide an improved method for defining a clutch slipping point position of a clutch in a gearbox.

SUMMARY

In view of the above, an object of the invention is to provide an improved method for defining a clutch slipping point position of a clutch in a gearbox which at least in some aspect alleviates at least one of the drawbacks of the prior art, and/or to at least provide a useful alternative.

According to a first aspect of the invention, the object is achieved by a method according to claim 1. According to a second aspect of the invention, the object is achieved by a control unit according to claim 7. According to a third aspect of the invention, the object is achieved by a gearbox according to claim 13. According to a fourth aspect of the invention, the object is achieved by a vehicle according to claim 16. According to a fifth aspect of the invention, the object is achieved by a computer program according to claim 17. According to a sixth aspect of the invention, the object is achieved by a computer-readable medium according to claim 18.

According to the first aspect thereof, the object is achieved by a method for defining a clutch slipping point position of a clutch in a gearbox, wherein the gearbox comprises an input shaft and wherein the input shaft is arranged to be braked by a braking means, the method comprising:
  determining if the clutch is dragging when the clutch is fully disengaged;
  when it is determined that the clutch is dragging, applying the braking means with a predetermined brake torque and so that the input shaft is not rotating; and thereafter:
  moving the clutch from the fully disengaged position towards an engaged position;
  determining when the input shaft starts to rotate with a predetermined rotation value indicative of a rotational speed of the input shaft;
  registering a clutch position in which the clutch is positioned when the predetermined rotation value is reached;
  using a clutch transfer characteristics of the clutch, the predetermined brake torque and the registered clutch position to define the clutch slipping point position.

The expression "dragging" with respect to the clutch means herein that the input shaft of the gearbox starts to rotate, or rotates, even if the clutch is fully disengaged.

A clutch transfer characteristics is a characteristic which is known for the specific clutch. A skilled person is well aware of that there are specific clutch transfer characteristics for specific clutches.

By the provision of the invention as disclosed herein, an improved method for defining a clutch slipping point position of a clutch in a gearbox is achieved. More specifically, it has been found that some clutches may transfer torque all the way out to the disengaged position, including the disengaged position, resulting in a dragging torque, and this dragging torque may be higher than internal losses in the gearbox. In such a case, the gearbox input shaft will start to rotate immediately and when the actual clutch slipping point position is reached the input shaft will be synchronized with the engine. This will make it hard to determine the clutch slipping point. As such, by the provision of the present invention, by applying a braking means with a predetermined brake torque and so that the input shaft is not rotating, a following clutch slipping point position estimation may be more accurately and swiftly conducted. By applying the braking means, it can be assured that the input shaft does not start to rotate due to e.g. a minor clutch drag torque.

Optionally, the clutch may be moved from the fully disengaged position towards the engaged position with a predefined speed. Thereby more reliable and controlled clutch slipping point position estimation may be conducted.

Optionally, the method may further comprise:
  disengaging the clutch to its fully disengaged position after the registered clutch position has been reached;
  applying the braking means again; and thereafter:
  releasing the braking means;
  moving the clutch to the defined clutch slipping point position;
  determining an acceleration of the input shaft to verify that it corresponds to a desired slipping point torque.

Thereby it can be verified that the defined clutch slipping point position corresponds to a desired slipping point torque, implying an improved and more reliable method.

Optionally, the clutch may be moved to the defined clutch slipping point position at a moving speed which corresponds to a maximum moving speed of the clutch, or at least corresponds to 70%, 80% or 90% of the maximum moving speed of the clutch. Thereby the verification can be more swiftly conducted by using a relatively high moving speed.

Still optionally, the method may further comprise:
make an adjustment of the clutch slipping point position towards more engaged if the determined acceleration of the input shaft is too low such that it does not correspond to the desired slipping point torque.

Still optionally, the method may further comprise:
make an adjustment of the clutch slipping point position towards more disengaged if the determined acceleration of the input shaft is too high such that it does not correspond to the desired slipping point torque.

Thereby, in view of any one of the above two adjustments of the clutch slipping point position, a more accurate clutch slipping point position may be obtained.

According to the second aspect thereof, the object is achieved by a control unit for a gearbox comprising an input shaft and a clutch for the input shaft, and wherein the input shaft is arranged to be braked by a braking means, wherein the control unit is configured to:
determine if the clutch is dragging when the clutch is fully disengaged;
when it is determined that the clutch is dragging, issue a first signal to apply the braking means with a predetermined brake torque and so that the input shaft is not rotating; and thereafter:
issue a second signal to move the clutch from the fully disengaged position towards an engaged position;
determine when the input shaft starts to rotate with a predetermined rotation value indicative of a rotational speed of the input shaft;
register a clutch position in which the clutch is positioned when the predetermined rotation value is reached;
use a clutch transfer characteristics of the clutch, the predetermined brake torque and the registered clutch position to define the clutch slipping point position.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

Optionally, the control unit may be configured to issue the second signal to move the clutch from the fully disengaged position towards the engaged position with a predefined speed.

Optionally, the control unit may further be configured to:
issue a third signal to disengage the clutch to its fully disengaged position after the registered clutch position has been reached;
issue a fourth signal to apply the braking means again; and thereafter:
issue a fifth signal to release the braking means;
issue a sixth signal to move the clutch to the defined clutch slipping point position;
determining an acceleration of the input shaft to verify that it corresponds to a desired slipping point torque.

Optionally, the control unit may be configured to issue the sixth signal to move the clutch to the defined clutch slipping point position at a moving speed which corresponds to a maximum moving speed of the clutch, or at least corresponds to 70%, 80% or 90% of the maximum moving speed of the clutch.

Optionally, the control unit may further be configured to:
make an adjustment of the clutch slipping point position towards more engaged if the determined acceleration of the input shaft is too low such that it does not correspond to the desired slipping point torque.

Optionally, the control unit may further be configured to:
make an adjustment of the clutch slipping point position towards more disengaged if the determined acceleration of the input shaft is too high such that it does not correspond to the desired slipping point torque.

According to the third aspect thereof, the object is achieved by a gearbox comprising an input shaft and a clutch for the input shaft, and wherein the input shaft is arranged to be braked by a braking means, and further comprising the control unit according to any one of the embodiments of the second aspect of the invention.

Advantages and effects provided by the third aspect of the invention are largely analogous to the advantages and effects provided by the first aspect of the invention. It shall also be noted that all embodiments of the third aspect of the invention are applicable to and combinable with all embodiments of the first and second aspects of the invention and vice versa.

Optionally, the gearbox may further comprise a sensor for measuring a value indicative of a rotational speed of the input shaft, wherein the sensor is in communicative contact with the control unit.

Optionally, the braking means may be any one of a gearbox brake of the gearbox and/or an auxiliary braking means not being part of the gearbox, such as a motor brake.

Preferably, the clutch is arranged to drivingly disengage and engage the input shaft with respect to a power unit of the vehicle, e.g. an internal combustion engine of the vehicle, or any other power unit, such as an electrical motor.

According to the fourth aspect thereof, the object is achieved by a vehicle comprising the control unit according to any one of the embodiments of the second aspect of the invention and/or the gearbox according to any one of the embodiments of the third aspect of the invention.

Advantages and effects provided by the fourth aspect of the invention are largely analogous to the advantages and effects provided by the first aspect of the invention. It shall also be noted that all embodiments of the fourth aspect of the invention are applicable to and combinable with all embodiments of the first, second and third aspects of the invention and vice versa.

According to the fifth aspect thereof, the object is achieved by a computer program comprising program code means for performing the steps of any of the embodiments of the first aspect of the invention, when said program is run on a computer.

According to the sixth aspect thereof, the object is achieved by a computer readable medium carrying a computer program comprising program code means for performing the steps of any of the embodiments of the first aspect of the invention, when said program product is run on a computer.

BRIEF DESCRIPTION OF THE DRAWINGS

With reference to the appended drawings, below follows a more detailed description of embodiments of the invention cited as examples.

In the drawings.

Figure 1:
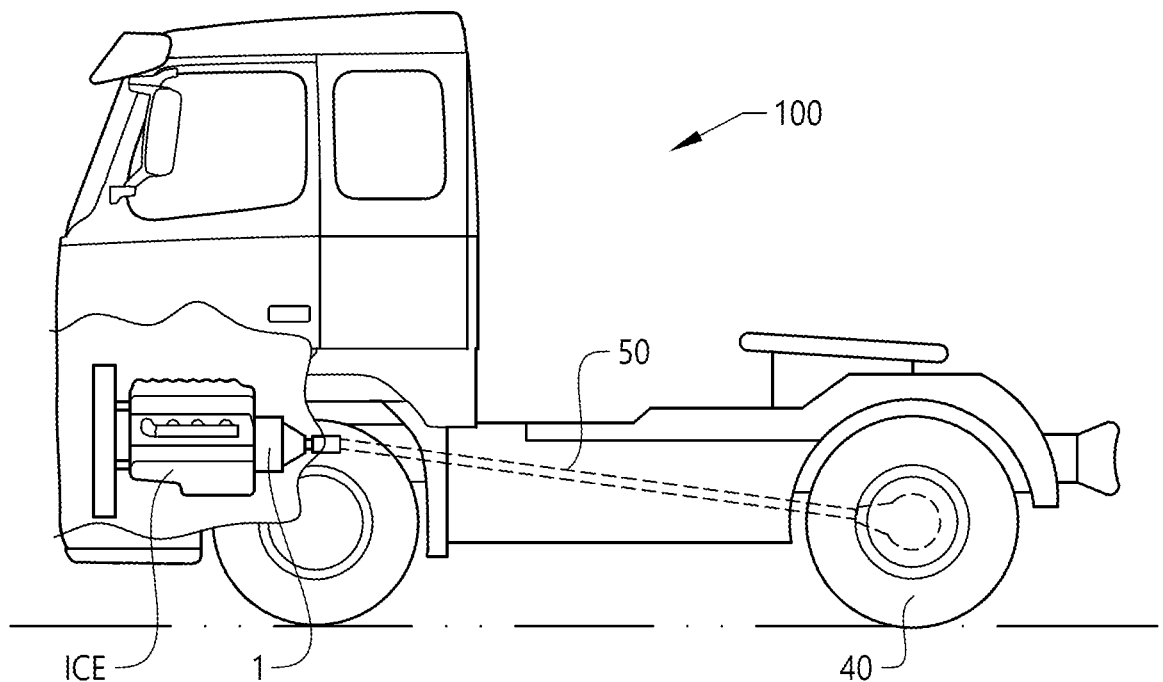
FIG. 1 shows a side view of a vehicle according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 4:
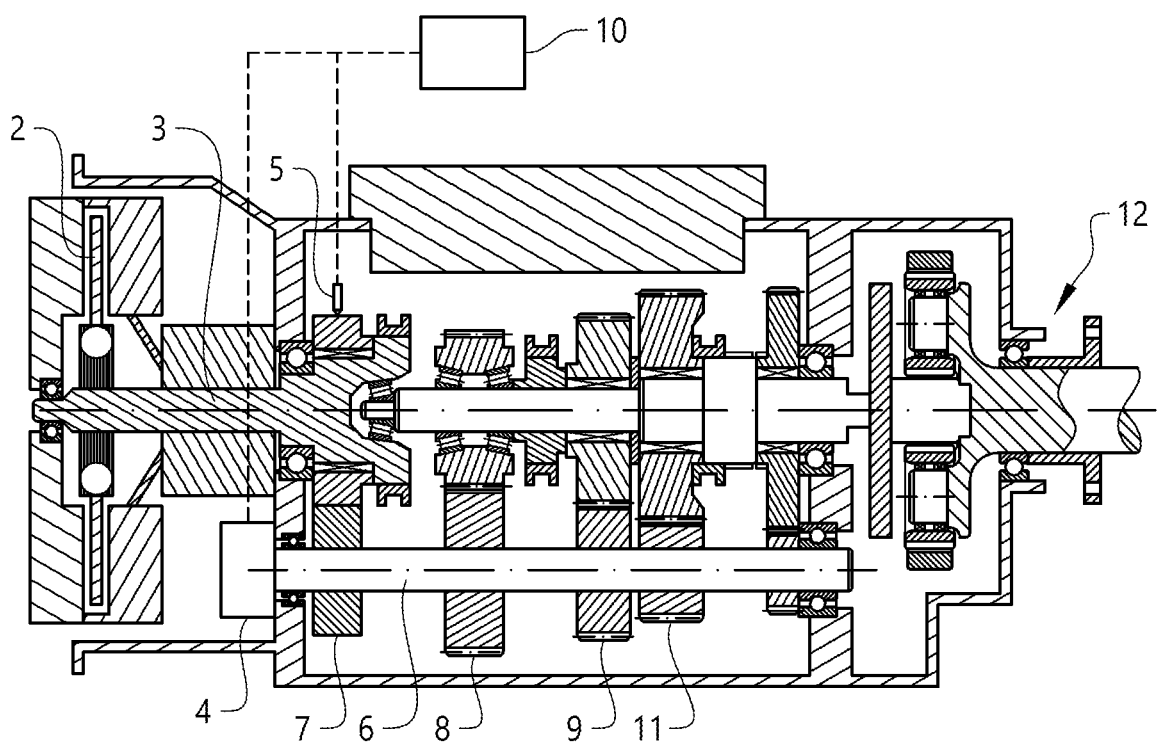
FIG. 4 shows a schematic view of a gearbox according to an example embodiment of the present invention.

FIG. 1 shows a vehicle in the form of a heavy-duty truck 100. The truck 100 comprises a gearbox 1 according to an example embodiment of the present invention which is drivingly connected to an internal combustion engine ICE. The gearbox 1 may for example be the gearbox as shown in FIG. 4. Even though an internal combustion engine ICE is shown, the present invention is also applicable to other power units, and combinations thereof, such one or more electric motors drivingly connected to the gearbox 1. The gearbox 1 is in this embodiment connected to a propeller shaft 50, which is configured to transfer torque to rear-wheels 40. Even though a truck 1 is shown, the present invention is applicable to any type of vehicle, such as a bus, a construction equipment vehicle, a passenger car or the like.

Figure 2:
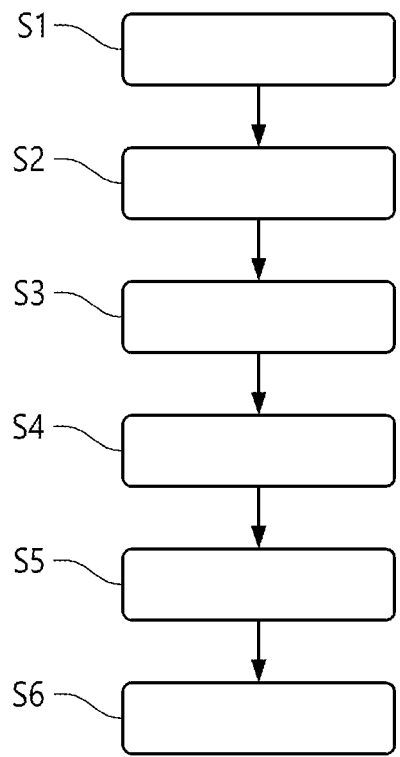
FIG. 2 shows a flowchart of a method according to an example embodiment of the present invention.

With respect to especially FIG. 2 and FIG. 3 an example embodiment of a method according to the first aspect of the invention will be described. Hence, FIG. 2 shows a flowchart of a method for defining a clutch slipping point position $X_{sp}$ of a clutch 2 (see FIG. 4) in a gearbox 1. The gearbox 1 comprises an input shaft 3 (see FIG. 4) and a clutch 2 for the input shaft 3, and the input shaft 3 is arranged to be braked by a braking means 4. The braking means 4 may be a brake of the gearbox, as shown in FIG. 4, or any other braking means.

The method illustrated in the flowchart comprises:
S1: determining if the clutch 2 is dragging when the clutch is fully disengaged;
S2: when it is determined that the clutch 2 is dragging, applying the braking means 4 with a predetermined brake torque $T_b$ and so that the input shaft 3 is not rotating; and thereafter:
S3: moving the clutch 2 from the fully disengaged position towards an engaged position;
S4: determining when the input shaft 3 starts to rotate with a predetermined rotation value indicative of a rotational speed of the input shaft 3;
S5: registering a clutch position $X_b$ which the clutch is having when the predetermined rotation value is reached;
S6: using a clutch transfer characteristics $C_{tc}$ of the clutch 2, the predetermined brake torque $T_b$ and the registered clutch position $X_b$ to define the clutch slipping point position $X_{sp}$.

Figure 3:
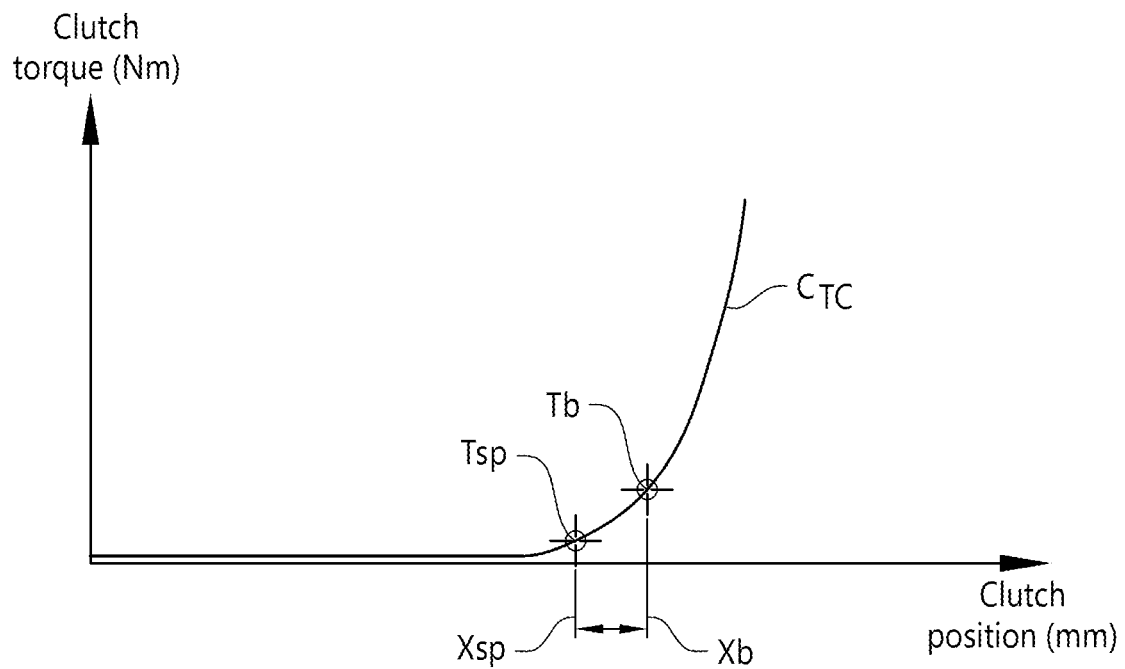
FIG. 3 shows a diagram exemplifying an embodiment of the present invention.

The clutch transfer characteristics $C_{tc}$ as shown in FIG. 3 is a predefined clutch transfer characteristics of a gearbox 1, such as the gearbox 1 shown in FIG. 4. A clutch transfer characteristics $C_{tc}$, e.g. in the form of a curve as the one shown in FIG. 3, may be provided for each unique gearbox and/or for a specific type of gearbox. It is well known for the skilled person how to obtain the clutch transfer characteristics, which may be expressed as a curve which defines the clutch torque at a specific clutch position.

By use of the clutch transfer characteristics $C_{tc}$ of the clutch 2, the predetermined brake torque $T_b$ and the registered clutch position $X_b$, it is then possible to define the clutch slipping point position $X_{sp}$. More specifically, the clutch slipping point position $X_{sp}$ can be found by a slipping point torque $T_{sp}$ in the clutch transfer characteristics $C_{tc}$. The slipping point torque $T_{sp}$ may be defined as a torque value where the torque has started to increase from zero torque, or close to zero torque. Put differently, the slipping point torque $T_{sp}$ may be found in a section of the curve where a change of the derivative of the curve goes from zero to a positive value. For example, the slipping point torque $T_{sp}$ may be approximately 30 Nm as mentioned in the above.

The clutch 2 is preferably moved from the fully disengaged position towards the engaged position with a predefined speed, such as a predefined number of millimetres per second (mm/s).

In addition to the above mentioned steps, the method may further comprise to disengage the clutch 2 to its fully disengaged position after the registered clutch position $X_b$ has been reached and apply the braking means 4 again. Thereafter the following may be performed:
releasing the braking means 4;
moving the clutch 2 to the defined clutch slipping point position $X_{sp}$; and
determining an acceleration of the input shaft 3 to verify that it corresponds to a desired slipping point torque $T_{sp}$.

The clutch 2 may be moved to the defined clutch slipping point position $X_{sp}$ at a moving speed which corresponds to a maximum moving speed of the clutch 2, or at least corresponds to 70%, 80% or 90% of the maximum moving speed of the clutch.

Thereafter, the following may be performed:
making an adjustment of the clutch slipping point position $X_{sp}$ towards more engaged if the determined acceleration of the input shaft 3 is too low such that it does not correspond to the desired slipping point torque $T_{sp}$.

Further, the following may also be performed
making an adjustment of the clutch slipping point position $X_{sp}$ towards more disengaged if the determined acceleration of the input shaft 3 is too high such that it does not correspond to the desired slipping point torque $T_{sp}$.

FIG. 4 shows a schematic view of a gearbox 1 according to an example embodiment of the invention. The gearbox 1 is connected to a control unit 10 according to an embodiment of the second aspect of the invention. The gearbox 1 as shown is an automated mechanical transmission (AMT) for a truck and comprises a clutch 2, an input shaft 3, a countershaft 6, sets of intermeshing gear wheels 7, 8, 9, 11, and a range gear 12. The clutch 2 is adapted to drivingly disengage and engage the input shaft 3 with respect to e.g. the internal combustion engine ICE as shown in FIG. 1. The gearbox 1 further comprises a braking means 4, which here is connected to the countershaft 6, whereby the input shaft 3 is arranged to be braked by the braking means 4. The gearbox 1 further comprises a sensor 5 for measuring a value indicative of a rotational speed of the input shaft 3. The sensor 5 may for example be a speed sensor or a sensor which counts a number of cog wheels of a gear wheel which passes the sensor. The braking means 4 is connected to and adapted to be controlled by the control unit 10. The sensor 5 is also in communicative contact with the control unit 10.

The control unit 10 is configured to:
determine if the clutch 2 is dragging when the clutch is fully disengaged;
when it is determined that the clutch 2 is dragging, issue a first signal to apply the braking means 4 with a predetermined brake torque $T_b$ and so that the input shaft 3 is not rotating; and thereafter:
issue a second signal to move the clutch 2 from the fully disengaged position towards an engaged position;
determine when the input shaft 3 starts to rotate with a predetermined rotation value indicative of a rotational speed of the input shaft 3;
register a clutch position $X_b$ which the clutch is having when the predetermined rotation value is reached;
use a clutch transfer characteristics $C_{tc}$ of the clutch, the predetermined brake torque $T_b$ and the registered clutch position $X_b$ to define the clutch slipping point position $X_{sp}$.

The control unit 10 may be configured to issue the second signal to move the clutch 2 from the fully disengaged position towards the engaged position with a predefined speed.

The control unit 10 may include a microprocessor, microcontroller, programmable digital signal processor or another programmable device. The control unit 10 may also, or instead, include an application specific integrated circuit, a programmable gate array or programmable array logic, a programmable logic device, or a digital signal processor. Where the control unit 10 includes a programmable device such as the microprocessor, microcontroller or programmable digital signal processor mentioned above, the processor may further include computer executable code that controls operation of the programmable device. The control unit 10 may comprise embedded hardware, sometimes with integrated software, where the hardware show close physical relationship. Examples of physical relationships are: shared casing and components mounted on one or several circuit boards. It shall be noted that the control unit 10 may be formed by one or more connected sub control units, or equivalent computer resources.

The control unit 10 may further be configured to:
issue a third signal to disengage the clutch 2 to its fully disengaged position after the registered clutch position $X_b$ has been reached;
issue a fourth signal to apply the braking means 4 again; and thereafter:
issue a fifth signal to release the braking means 4;
issue a sixth signal to move the clutch 2 to the defined clutch slipping point position $X_{sp}$;
determining an acceleration of the input shaft 3 to verify that it corresponds to a desired slipping point torque $T_{sp}$.

The control unit 10 may further be configured to issue the sixth signal to move the clutch 2 to the defined clutch slipping point position $X_{sp}$ at a moving speed which corresponds to a maximum moving speed of the clutch 2, or at least corresponds to 70%, 80% or 90% of the maximum moving speed of the clutch 2.

The control unit 10 may further be configured to:
make an adjustment of the clutch slipping point position $X_{sp}$ towards more engaged if the determined acceleration of the input shaft 3 is too low such that it does not correspond to the desired slipping point torque $T_{sp}$.

The control unit 10 may further be configured to:
make an adjustment of the clutch slipping point position $X_{sp}$ towards more disengaged if the determined acceleration of the input shaft is too high such that it does not correspond to the desired slipping point torque $T_{sp}$.

The method as described herein may preferably be performed when the vehicle is in a work shop for e.g. service and/or when the vehicle is standing still, e.g. during a driver break.

It is to be understood that the present invention is not limited to the embodiments described above and illustrated in the drawings; rather, the skilled person will recognize that many changes and modifications may be made within the scope of the appended claims.

The invention claimed is:

1. A method for defining a clutch slipping point position ($X_{sp}$) of a clutch in a gearbox, wherein the gearbox comprises an input shaft and wherein the input shaft is arranged to be braked by a brake, the method comprising:
determining if the clutch is dragging when the clutch is fully disengaged;
when it is determined that the clutch is dragging, applying the braking means with a predetermined brake torque ($T_b$) and so that the input shaft is not rotating; and thereafter:
moving the clutch from the fully disengaged position towards an engaged position;
determining when the input shaft starts to rotate with a predetermined rotation value indicative of a rotational speed of the input shaft;
registering a clutch position ($X_b$) in which the clutch is positioned when the predetermined rotation value is reached;
using a clutch transfer characteristics of the clutch, the predetermined brake torque ($T_b$) and the registered clutch position ($X_b$) to define the clutch slipping point position ($X_{sp}$).

2. The method according to claim 1, wherein the clutch is moved from the fully disengaged position towards the engaged position with a predefined speed.

3. The method according to claim 1, further comprising:
disengaging the clutch to its fully disengaged position after the registered clutch position has been reached;
applying the braking means again; and thereafter:
releasing the braking means;
moving the clutch to the defined clutch slipping point position; and
determining an acceleration of the input shaft to verify that it corresponds to a desired slipping point torque ($T_{sp}$).

4. The method according to claim 3, wherein the clutch is moved to the defined clutch slipping point position at a moving speed which corresponds to one of a maximum moving speed of the clutch, or at least corresponds to 70%, 80% or 90% of the maximum moving speed of the clutch.

5. The method according to claim 3, further comprising:
making an adjustment of the clutch slipping point position towards more engaged if the determined acceleration of the input shaft is too low such that it does not correspond to the desired slipping point torque.

6. The method according to claim 3, further comprising:
making an adjustment of the clutch slipping point position towards more disengaged if the determined acceleration of the input shaft is too high such that it does not correspond to the desired slipping point torque.

7. A non-transitory computer readable medium carrying a computer program comprising computer-executable instructions that, when said computer program is run on a computer, cause the computer to perform the operations of claim 1.

8. A control unit for a gearbox comprising an input shaft (3) and a clutch for the input shaft, and wherein the input shaft is arranged to be braked by a brake, wherein the control unit is configured to:
  determine if the clutch is dragging when the clutch is fully disengaged;
  when it is determined that the clutch is dragging, issue a first signal to apply the braking means with a predetermined brake torque ($T_b$) and so that the input shaft is not rotating; and thereafter:
    issue a second signal to move the clutch from the fully disengaged position towards an engaged position;
    determine when the input shaft starts to rotate with a predetermined rotation value indicative of a rotational speed of the input shaft;
    register a clutch position ($X_b$) in which the clutch is positioned when the predetermined rotation value is reached; and
  use a clutch transfer characteristics of the clutch, the predetermined brake torque ($T_b$) and the registered clutch position ($X_b$) to define the clutch slipping point position ($X_{sp}$).

9. The control unit according to claim 8, wherein the control unit is configured to issue the second signal to move the clutch from the fully disengaged position towards the engaged position with a predefined speed.

10. The control unit according to claim 8, further configured to:
  issue a third signal to disengage the clutch to its fully disengaged position after the registered clutch position has been reached;
  issue a fourth signal to apply the braking means again; and thereafter:
  issue a fifth signal to release the braking means;
  issue a sixth signal to move the clutch to the defined clutch slipping point position; and
  determining an acceleration of the input shaft to verify that it corresponds to a desired slipping point torque.

11. The control unit according to claim 10, wherein the control unit is configured to issue the sixth signal to move the clutch to the defined clutch slipping point position at a moving speed which corresponds to one of a maximum moving speed of the clutch or at least corresponds to 70%, 80% or 90% of the maximum moving speed of the clutch.

12. The control unit according to claim 10, further configured to:
  make an adjustment of the clutch slipping point position towards more engaged if the determined acceleration of the input shaft is at a low acceleration such that the acceleration does not correspond to the desired slipping point torque.

13. The control unit according to claim 10, further configured to:
  make an adjustment of the clutch slipping point position towards more disengaged if the determined acceleration of the input shaft is-tee high such that it does not correspond to the desired slipping point torque.

14. A gearbox comprising an input shaft and a clutch for the input shaft, and wherein the input shaft is arranged to be braked by a brake, and further comprising the control unit according to claim 8.

15. The gearbox according to claim 14, further comprising a sensor for measuring a value indicative of a rotational speed of the input shaft, wherein the sensor is in communicative contact with the control unit.

16. The gearbox according to claim 14, wherein the braking means is any one of a gearbox brake of the gearbox and/or an auxiliary braking means not being part of the gearbox.

17. A vehicle comprising the control unit according to claim 8 and an input shaft and a clutch for the input shaft, and wherein the input shaft is arranged to be braked by a braking means.

* * * * *

UNITED STATES PATENT AND TRADEMARK OFFICE
CERTIFICATE OF CORRECTION

| | |
|---|---|
| PATENT NO. | : 11,846,330 B2 |
| APPLICATION NO. | : 17/785577 |
| DATED | : December 19, 2023 |
| INVENTOR(S) | : Magnus Blanckenfiell and Fredrik Karpenman |

It is certified that error appears in the above-identified patent and that said Letters Patent is hereby corrected as shown below:

On the Title Page

Applicant reads, "VOLVO TRUCK CORPORATION, Gothenburg (SE)" should read -- Volvo Truck Corporation, Göteborg (SE) --

Assignee reads, "Volvo Truck Corporation, Gothenburg (SE)" should read -- VOLVO TRUCK CORPORATION, Göteborg (SE) --

Signed and Sealed this
Thirtieth Day of January, 2024

Katherine Kelly Vidal
*Director of the United States Patent and Trademark Office*